(12) United States Patent
Kallanagoudar et al.

US011593583B2

(10) Patent No.: US 11,593,583 B2
(45) Date of Patent: Feb. 28, 2023

(54) METHOD AND SYSTEM TO IMPLEMENT CLUSTER FAILURE PREDICTION TO FACILITATE SPLIT BRAIN RESOLUTION

(71) Applicant: Oracle International Corporation, Redwood Shores, CA (US)

(72) Inventors: Mahesh Kallanagoudar, Cupertino, CA (US); Ming Zhu, Redwood City, CA (US)

(73) Assignee: Oracle International Corporation

( * ) Notice: Subject to any disclaimer, the term of this patent is extended or adjusted under 35 U.S.C. 154(b) by 818 days.

(21) Appl. No.: 16/457,445

(22) Filed: Jun. 28, 2019

(65) Prior Publication Data

US 2020/0410284 A1    Dec. 31, 2020

(51) Int. Cl.
| | |
|---|---|
| G06K 9/62 | (2022.01) |
| G06N 7/00 | (2023.01) |
| G06F 12/12 | (2016.01) |
| G06F 16/906 | (2019.01) |

(52) U.S. Cl.
CPC .......... *G06K 9/6223* (2013.01); *G06F 12/12* (2013.01); *G06F 16/906* (2019.01); *G06N 7/005* (2013.01)

(58) Field of Classification Search
CPC ..... G06K 9/6223; G06F 16/906; G06F 12/12; G06N 7/005
See application file for complete search history.

(56) References Cited

U.S. PATENT DOCUMENTS

| | | |
|---|---|---|
| 6,192,401 B1 | 2/2001 | Modiri et al. |
| 7,287,180 B1 | 10/2007 | Chen et al. |
| 7,464,147 B1 | 12/2008 | Fakhouri et al. |
| 8,041,773 B2 | 10/2011 | Abu-ghazaleh et al. |
| 8,055,735 B2 | 11/2011 | Krishnappa et al. |
| 8,493,978 B2 | 7/2013 | Arribas et al. |
| 8,965,921 B2 | 2/2015 | Gajic |
| 9,201,742 B2 | 12/2015 | Bulkowski et al. |
| 9,448,966 B2 | 9/2016 | Varakur et al. |
| 9,672,115 B2 | 6/2017 | Earl et al. |
| 9,692,820 B2 | 6/2017 | Chaudhary et al. |
| 9,774,401 B1 | 9/2017 | Borrill |
| 9,800,549 B2 | 10/2017 | Leung et al. |
| 9,805,108 B2 | 10/2017 | Merriman et al. |
| 9,807,154 B2 | 10/2017 | Darling et al. |
| 9,836,366 B2 | 12/2017 | Schatz et al. |
| 10,320,702 B2 | 6/2019 | Gahlot et al. |
| 10,331,801 B2 | 6/2019 | Marsden |
| 10,417,102 B2 | 9/2019 | Sanakkayala et al. |
| 10,445,433 B2 | 10/2019 | Srinivasan et al. |

(Continued)

OTHER PUBLICATIONS

Wikipedia, "k-means clustering", Wikipedia, (Jun. 14, 2020).

(Continued)

*Primary Examiner* — Henry Tsai
*Assistant Examiner* — John B Roche
(74) *Attorney, Agent, or Firm* — Vista IP Law Group, LLP

(57) ABSTRACT

Described is a system, method, and computer program product for performing elections in a database cluster, where system resource statistics information is used to predict a cluster node failure. Resource statistics data is classified and used to identify anomalies. The anomalies can be used to determine the probability of a cluster node failure and to then elect a new master node and/or surviving sub-cluster.

21 Claims, 19 Drawing Sheets

(56) References Cited

U.S. PATENT DOCUMENTS

| | | | |
|---|---|---|---|
| 10,614,098 B2 | 4/2020 | Horowitz et al. | |
| 10,678,457 B2 | 6/2020 | Jawahar et al. | |
| 10,719,417 B2 | 7/2020 | Wu et al. | |
| 10,725,883 B2 | 7/2020 | Ganesan et al. | |
| 10,740,353 B2 | 8/2020 | Horowitz et al. | |
| 10,747,592 B2 | 8/2020 | Kolodzieski et al. | |
| 2007/0299950 A1 | 12/2007 | Kulkarni | |
| 2009/0037902 A1* | 2/2009 | Gebhart | H04L 67/1001 717/174 |
| 2015/0280436 A1* | 10/2015 | Weckx | H02J 13/0079 700/295 |
| 2017/0229868 A1 | 8/2017 | Laval et al. | |
| 2017/0286518 A1 | 10/2017 | Horowitz et al. | |
| 2018/0035419 A1* | 2/2018 | Beattie, Jr. | H04W 72/085 |
| 2018/0097845 A1 | 4/2018 | Chen et al. | |
| 2019/0208011 A1 | 7/2019 | Dutta et al. | |
| 2019/0244129 A1* | 8/2019 | Tabuchi | G06N 20/00 |
| 2019/0306231 A1 | 10/2019 | Shimoga Manjunatha et al. | |
| 2020/0028902 A1 | 1/2020 | Rajagopalan et al. | |
| 2020/0034245 A1 | 1/2020 | Kohler | |
| 2020/0097354 A1 | 3/2020 | Barnett | |
| 2020/0153898 A1 | 5/2020 | Sabath et al. | |

OTHER PUBLICATIONS

Amer, M. et al., "Nearest-Neighbor and Clustering based Anomaly Detection Algorithms for RapidMiner", Proceedings of the 3rd RapidMiner Community Meeting and Conferernce (RCOMM 2012), (Aug. 2012).

Wikipedia, "Priority queue", Wikipedia, (Jun. 9, 2019).

Strohm, R. et al., "Introduction to Oracle Clusterware", Oracle Clusterware Administration and Deployment Guide, 11g Release 2 (11.2), Oracle Help Center, (Jun. 2015).

Strohm, R. et al., "Redundant Interconnect Usage", Oracle Clusterware Administration and Deployment Guide, 12c Release 1(12.1), Oracle Help Center, (Jul. 2017).

Strohm, R. et al., "Overview of Oracle RAC Architecture and Processing", Oracle Clusterware Administration and Deployment Guide, 12c Release 1(12.1), Oracle Help Center, (Jul. 2017).

Bennage, C. et al., "Priority Queue pattern", Cloud Design Patterns, Microsoft Documents, (Jun. 23, 2017).

Non-Final Office Action dated Oct. 5, 2020 for related U.S. Appl. No. 16/457,368.

\* cited by examiner

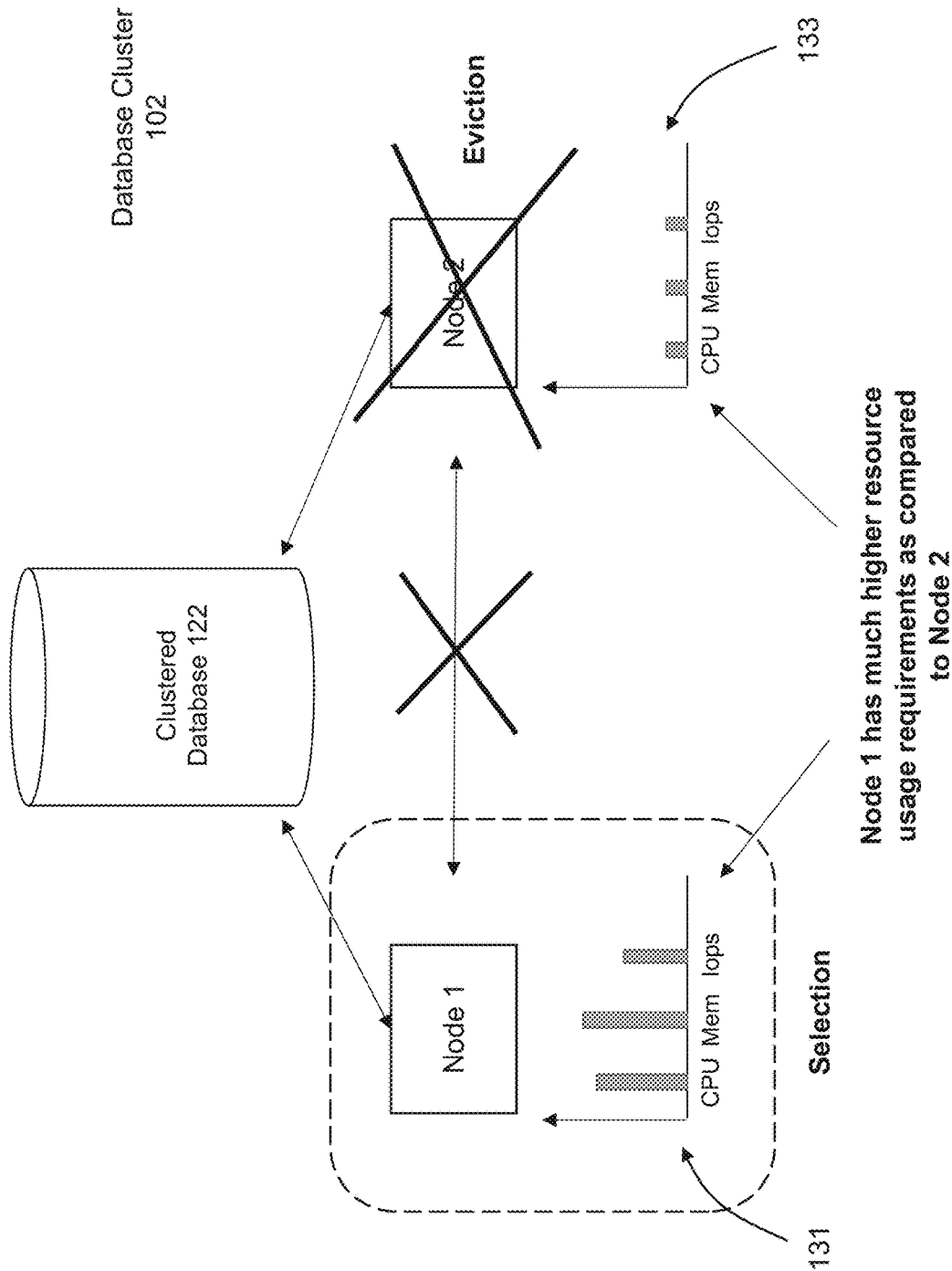

| Observations X | Node Percentage CPU Usage | Node Percentage Memory Usage | Distance from large cluster centre (x3) | Anomaly scores (average distance in large cluster C1 is 5.9) |
|---|---|---|---|---|
| X1 | 15 | 15 | 7.2 | 1.22 |
| X2 | 10 | 5 | 4.24 | 0.71 |
| X3 | 13 | 8 | 0 | 0 |
| X4 | 14 | 9 | 1.41 | 0.24 |
| X5 | 15 | 10 | 2.82 | 0.48 |
| X6 | 13 | 15 | 7 | 1.18 |
| X7 | 10 | 15 | 7.615 | 1.28 |
| X8 | 14 | 25 | 17 | 2.8 |
| X9 | 85 | 90 | 109.12 | 18.4 |
| X10 | 75 | 95 | 106.83 | 18.1 |

METHOD AND SYSTEM TO IMPLEMENT CLUSTER FAILURE PREDICTION TO FACILITATE SPLIT BRAIN RESOLUTION

CROSS REFERENCE TO RELATED APPLICATIONS

The present application is related to U.S. application Ser. No. 16/457,368, entitled "METHOD AND SYSTEM FOR TO IMPLEMENT MESSAGING FOR CLUSTER ELECTIONS", filed on even date herewith, which is hereby incorporated by reference in its entirety.

FIELD

This disclosure concerns a method, a computer program product, and a computer system for implementing database cluster systems.

BACKGROUND

A database clustering system allows the underlying servers within the computing infrastructure to communicate with each other so that they appear to function as a collective unit. Although the servers may be configured as standalone servers, each server has additional processes that communicate with other servers and where the different servers may access a shared/common set of database storage objects. The clustered database system therefore contains a shared architecture in which multiple running instances can each be used to manage a set of shared physical data files. Each of the database instances resides on a separate host and forms its own set of background processes and memory buffers, but in which the cluster infrastructure allows access to a single shared database via multiple database instances. In this way, the separate servers (e.g., nodes) appear as if they are one system to applications and end users.

In order for the database cluster to operate properly, these servers (e.g., nodes) will need to be able to communicate with one another in order to perform work. The database cluster as a whole cannot work properly if there is a breakdown of communications between the nodes. For example, many aspects of cluster interactions (e.g., lock management, cluster management, and status updates) cannot function properly if one or more nodes in the cluster are unable to communicate with the other nodes.

When a breakdown in communications occurs, there is often the need to identify which of the surviving nodes has been or should be designated as the "master" or "leader" node. To explain, consider the situation of a 2-node cluster that experiences a communications failure. In this situation, the two nodes in the cluster will be unable to communicate with each other, and hence it would not be feasible to allow each node to continue operating independently of the other since this may result in inconsistent data changes being applied by each node. Therefore, a leadership election may need to be performed to identify a specific master node to initiate a reconfiguration of the cluster, where the node that is designated as the master node survives while the other node is evicted. This allows the master to continue operating in a data-consistent manner until the evicted node can be eventually brought up and correctly integrated into the surviving cluster. Therefore, the master/leader election in the event of a failure is a critical step, since this decision directly determines the composition of the surviving cluster.

The approach described in the preceding paragraph with respect to a 2-node cluster can similarly be applied in clusters having more than two nodes. For a cluster having more than two nodes, the reconfiguration process may result in multiple sub-clusters that group together nodes that can still communicate with each other. For example, in a 4-node cluster, a communication failure may result in a first sub-cluster having node 1 and node 2 that can still communicate with each other, a second sub-cluster having node 3 that cannot communicate with any of the other nodes, and a third sub-cluster having node 4 that likewise is unable to communicate with the other nodes. In this situation, a master election process is applied to select one of the nodes in a sub cluster to be a master and thus its corresponding sub-cluster to be the surviving cluster (the sub-cluster having nodes 1 and 2), which results in eviction of the nodes of the other sub-clusters (e.g., nodes 3 and 4).

Various approaches may be taken to identify the master node after a cluster failure. One simplistic approach is to identify the sub-cluster having the largest number of nodes, and then to elect a master from that sub-cluster. In the above example of the 4-node cluster having a first sub-cluster with nodes 1 and 2 as members, a second sub-cluster having node 3 as its sole member, and a third sub-cluster having node 4 as its sole member, this means that a member of the first sub-cluster would be elected as the master since this sub-cluster has the largest number of members.

The problem addressed by the present disclosure pertains to the situation where a tie occurs when considering the parameters and/or weights of the criteria used to select the master node. To explain, consider a 4-node cluster in which a communications failure results in two sub-clusters, where a first sub-cluster includes nodes 1 and 2 and a second sub-cluster includes nodes 3 and 4. Assume that the criteria for selecting a master is, as explained above, to identify the sub-cluster having the largest number of nodes, and then to elect a master from that sub-cluster. In this example situation, consideration of the criteria for selecting the master node results in a tie between the two sub-clusters, since both sub-clusters have an equal number of nodes.

A tie-breaker can be used when a tie occurs between two sub-clusters. For example, one possible approach that can be used as the tie-breaker is to identify the node having the smallest/lowest node ID as the master node, on the assumption that the node having the smallest node ID value is the first or earliest node started in the cluster. In the above example of the two sub-clusters where the first sub-cluster includes nodes 1 and 2 and the second sub-cluster includes nodes 3 and 4, this tie-break approach would result in election of node 1 as the master node, since node 1 has the lowest node ID number among the group of surviving nodes.

The problem is that this approach may be overly simplistic in many circumstances, and may not result in an optimal result. For example, consider if node 1 in the above example is the node that is currently the most overloaded node among the group of surviving nodes. In this situation, it may be a mistake to force the most overloaded node to assume that additional resource requirements needed to perform the duties of a master node for cluster reconfiguration simply because that node just happens to have the lowest node ID number.

Therefore, what is needed is an improved approach to implement elections in the event of a failure to a clustered database system.

SUMMARY

According to some embodiments, a system, method, and computer program product is provided to perform elections in a database cluster, where system resource statistics information is used to predict a cluster node failure. Resource statistics data is classified and used to identify anomalies. The anomalies can be used to determine the probability of a cluster node failure and to then elect a new master node and/or surviving sub-cluster.

Further details of aspects, objects and advantages of the disclosure are described below in the detailed description, drawings and claims. Both the foregoing general description and the following detailed description are exemplary and explanatory, and are not intended to be limiting as to the scope of the disclosure.

BRIEF DESCRIPTION OF FIGURES

The drawings illustrate the design and utility of some embodiments of the present disclosure. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope.

FIGS. 1A-1E illustrate a tie-break process for split resolution.

FIG. 4 shows a table of values according to some embodiments of the invention.

DETAILED DESCRIPTION

Various embodiments will now be described in detail, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

As noted above, the problem addressed by the present disclosure pertains the situation where a communications failure occurs in a database clustering system. An improved approach is provided to more optimally select a master node after a cluster communications problem is identified.

Figure 1A:
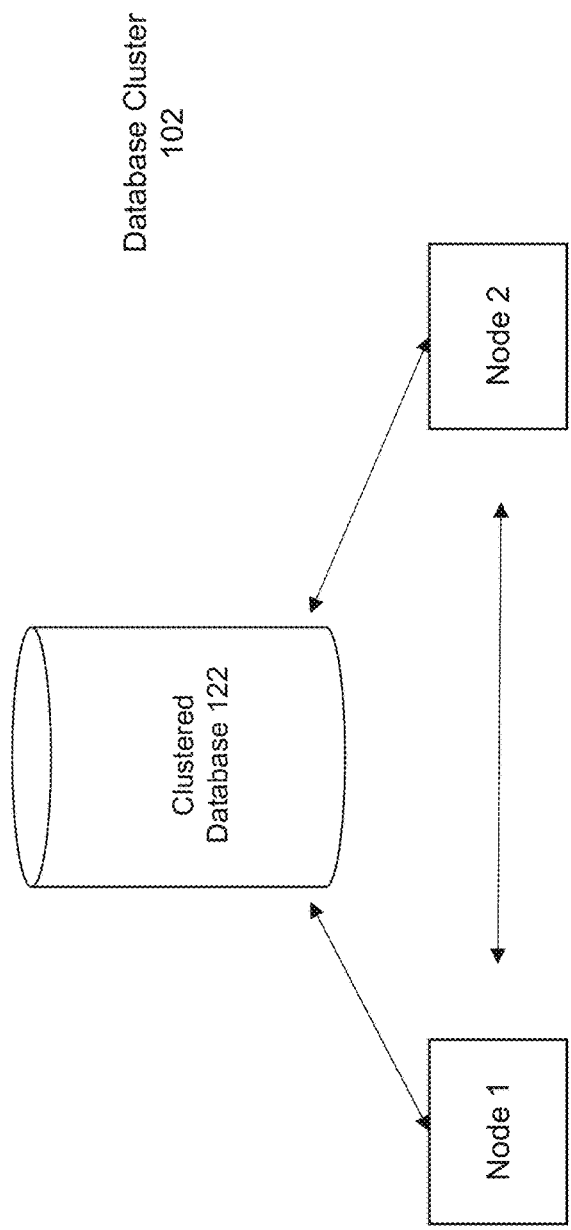

Before providing details of the invention, this disclosure will first illustratively explain the problem with simplistic tie-breaker solutions in the conjunction with a discussion of FIGS. 1A-E. As illustrated in FIG. 1A, a 2-node database cluster 102 may be provided to handle workloads from one or more clients that seeks to access a database through one or more application/web servers (e.g., nodes 1 and 2). The database cluster includes clustered database storage 122, e.g., that is stored within multiple storage devices within a storage pool. The clustered database may have one or more database tables that are operated upon by the one or more clients, where the clients operate one or more user stations to issue SQL commands to be processed by the database. The database cluster 102 includes multiple interconnected computers or servers that appear as if they are one server to the end users and applications that seek to access the database through the nodes 1 and 2. There is a one-to-many relationship between the underlying database stored within storage pool and instances. Therefore, the data stored within the storage devices of the storage pool are commonly accessible by any of the nodes/instances that make up the cluster 102. The user stations and/or the servers within the system comprise any type of computing device that may be used to implement, operate, or interface with the database system. Examples of such devices include, for example, workstations, personal computers, mobile devices, servers, hosts, nodes, or remote computing terminals. The user station comprises a display device, such as a display monitor, for displaying a user interface to users at the user station. The user station also comprises one or more input devices for the user to provide operational control over the activities of the system, such as a mouse or keyboard to manipulate a pointing object in a graphical user interface to generate user inputs.

Each node in the database cluster may include one or more communications/storage devices or infrastructure, such as a network adapter, storage adapter, network monitor, and/or a cluster manager. The network adapter (e.g., network interface cards (NICs)) is a circuit board or card that is installed in a computer so that the computer can be connected to a network. A network adapter provides the computer with a dedicated, full-time connection to a network. Communications between the nodes of the database cluster are transmitted via the network adapters on each respective node via network communication channels(s). In some embodiments, the nodes may include multiple types of communication channels (e.g., network communication channel(s) and shared storage communication channel(s)) to communicate with other member nodes of the cluster. Each node of the cluster may be interconnected to one another via network communication channel(s) in order for the database cluster to operate properly, where each node within the cluster may be connected to the other member nodes in the cluster via network adapters installed/configured within the respective nodes. The network communication channel(s) may be implemented as a private network using a switch (or multiple switches) such that only the nodes in the cluster can access for network communications. In some embodiments, a network switch may be included to manage one or more network communication channels between a first set of network adapters and a second set of network adapters.

The storage adapter is a circuit board and/or integrated circuit adapter that provides input/output (I/O) processing and physical connectivity between a host system, or server, and a storage device. Examples of storage adapters may include a host bus adapter (HBA), and/or a Fibre Channel (FC) adapter. HBAs are typically defined by interconnect technology, speed, port count and system interface. An FC adapter is a hardware component that provides connectivity from a server to a storage area network (SAN). An FC adapter, which uses the Peripheral Component Interconnect (PCI) slots on the server, can include one or more ports. In some embodiments, communications between the nodes of the database cluster and the shared database(s) of the database cluster are transferred/transmitted over the configured shared storage communication channel(s) via at least the storage adapter(s) on respective member nodes of the database cluster. Shared storage communication channel is a different type of communication channel than the network communication channel. The shared storage communication channel connects the shared database with respective nodes of the database cluster via respective storage adapter(s) locally configured on each of the nodes.

Communication failures may occur between nodes in the cluster, e.g., due to hardware, software, and/or system workload problems. Various approaches may be taken to identify circumstances where a communications problem or failure has occurred. For example, network heartbeat processing can be used to determine whether one or more nodes in the database cluster has failed or is no longer communicatively available within the database cluster. This may occur, for example, when a node within the database cluster fails because it has been powered down by accident or if it suddenly crashes before sending out any type of communication to notify other nodes that is failing. Because the particular node was not able to communicate its health/status via the network communication channel, no other node in the database cluster may be aware of its failure. Network heartbeat processing resolves these types of issues. Normal operations for network heartbeat processing is for each node to send out a heartbeat signal to all other nodes in the cluster and to record the heartbeat responses received. When a first node detects that a second node has not responded to its heartbeat after a period of time (e.g., timeout period), the first node may begin the eviction process, but only after waiting the expiration of the timeout period.

In general, database applications interact with a database server by submitting commands that cause the database server to perform operations on data stored in a database. For the database server to process the commands, the commands typically conform to a database language supported by the database server. An example of a commonly used database language supported by many database servers is known as the Structured Query Language (SQL). A database "transaction" corresponds to a unit of activity performed at the database that may include any number of different statements or commands for execution. ACID (Atomicity, Consistency, Isolation, Durability) is a set of properties that guarantees that database transactions are processed reliably. Atomicity requires that each transaction is all or nothing; if any part of the transaction fails, then the database state should not be changed by the transaction. Consistency requires that a database remains in a consistent state before and after a transaction. Isolation requires that other operations cannot see the database in an intermediate state caused by the processing of a current transaction that has not yet committed. Durability requires that, once a transaction is committed, the transaction will persist.

However, some or all of these properties may be violated if a failure occurs within the cluster, where nodes within the cluster become unable to communicate with one another. For example, consider if a communications failure has occurred such that node 1 and node 2 are unable to communicate with each other. This results in a first sub-cluster that is formed with node 1 and a second sub-cluster that is formed with node 2. If this situation is not properly addressed, then each sub-cluster may think that it is the surviving node after the failure, and each sub-cluster will continue to independently process transactions on behalf of clients—without knowledge or coordination with the node(s) and transactions being processed in the other sub-cluster. This may result in data inconsistencies within the database, which is unacceptable if the database is required to processed transactions in a reliable and consistent way.

Figure 1B:
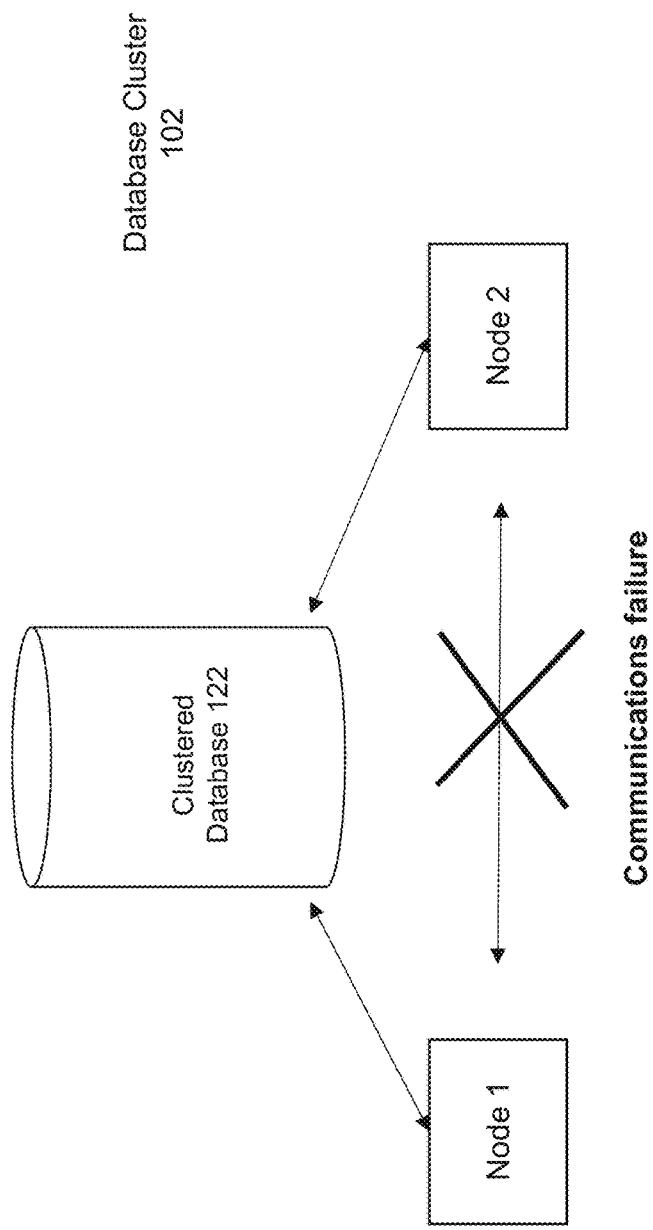

Therefore, when a breakdown in communications occurs as illustrated in FIG. 1B, there is often the need to identify which of the sub-clusters should be used to form the surviving cluster, with the nodes in the other sub-clusters being evicted from the cluster. This is typically implemented by electing one node from a sub-cluster as the master or leader node, and this master or leader node then initiates eviction processing on behalf of the cluster to evict the non-selected sub-cluster nodes.

As previously noted, various approaches may be taken to identify the master node after a cluster failure, where one approach is to simply identify the sub-cluster having the largest number of nodes, and then to elect a master from that sub-cluster. However, in the current 2-node cluster, it can be seen that each sub-cluster has the same number of nodes (first sub-cluster has node 1 and second sub-cluster has node 2), and therefore this simplistic approach results in a tie.

Figure 1C:
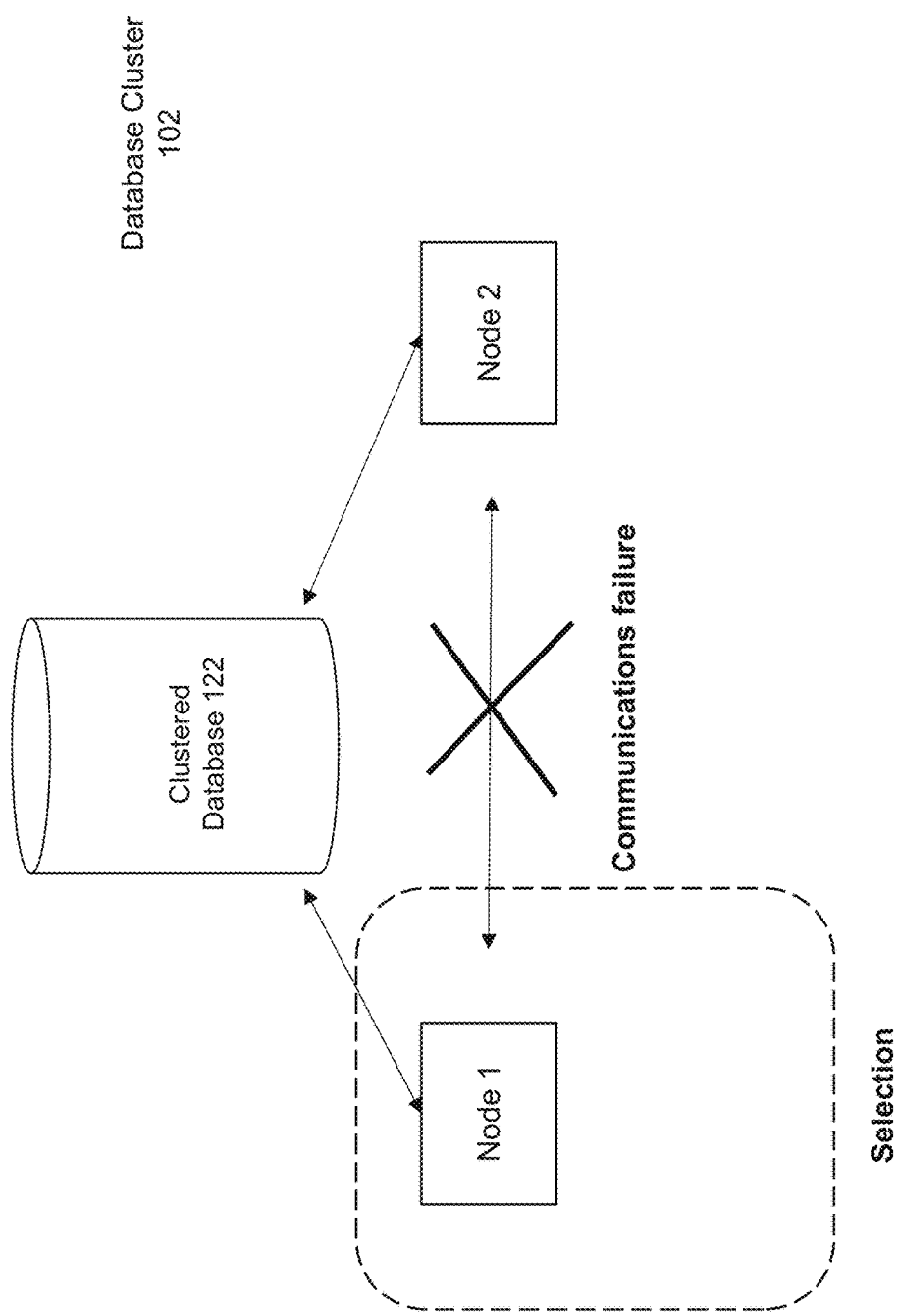
Figure 1D:
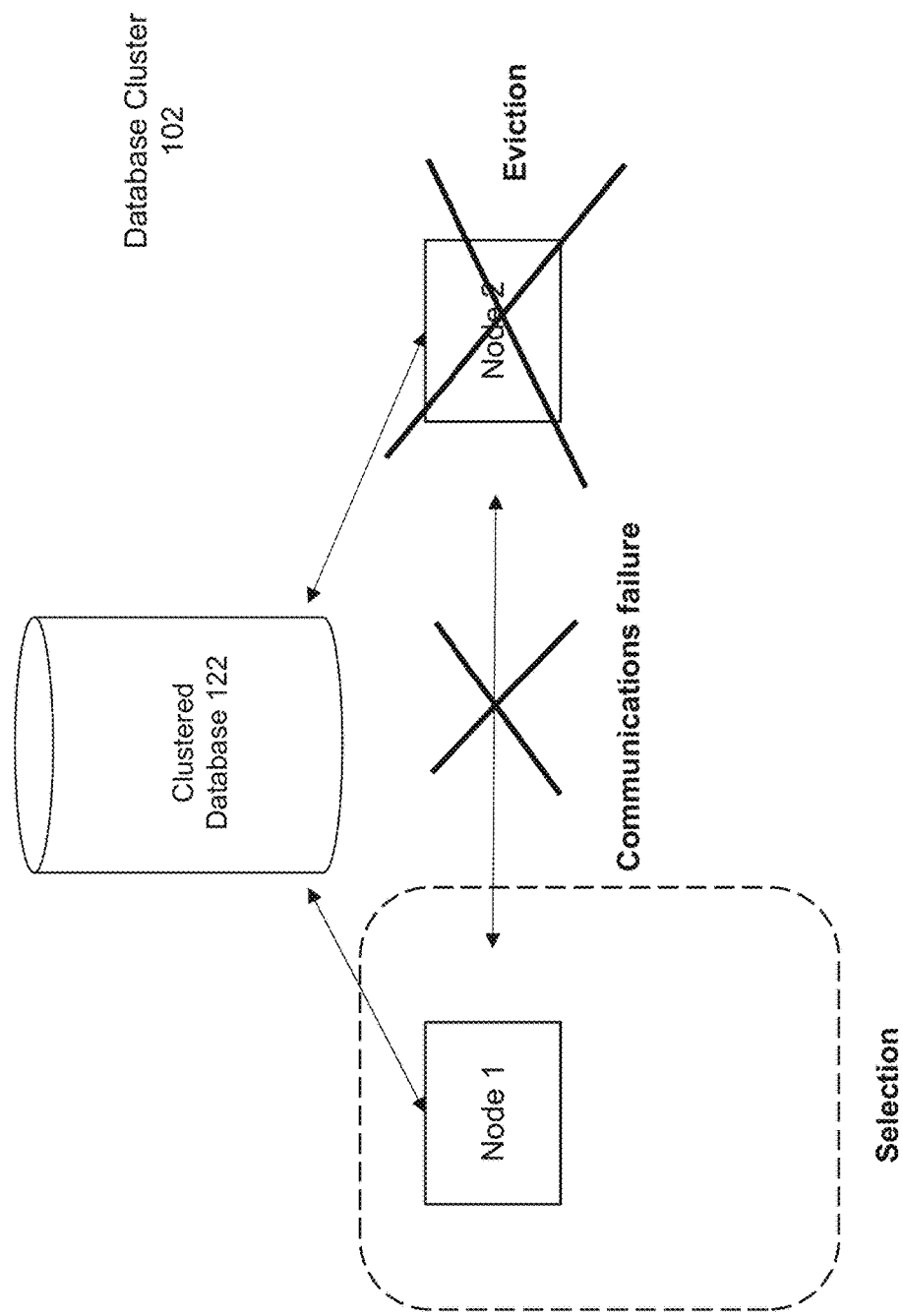

As a result, a tie-breaker may be applied since there is a tie with the parameters and/or weights for the criteria used to select the master node. Assume that the tie-breaker approach is to identify the node having the smallest/lowest node ID as the master node. As shown in FIG. 1C, this approach would result in selection of node 1 as the master node, since this node has a smaller node ID value as compared to node 2. Therefore, as illustrated in FIG. 1D, during reconfiguration the non-selected node (node 2) would be evicted from the cluster, and only allowed to rejoin the cluster after it has been properly brought up in a consistent manner relative to node 1.

As illustrated in FIG. 1E, the problem with this approach is that it may be overly simplistic in many circumstances and therefore result in a sub-optimal result. Here, it can be seen that resource consumption 131 for node 1 is much higher than the resource consumption for node 2. As a result, selection of node 1 means that the currently most-overloaded node is selected as the master node using the simplistic tie-break approach. For example, consider that one of the nodes may be experiencing a high CPU utilization which causes scheduling delays for the process responsible for handling cluster membership, and where the node with high CPU utilization (node 1) happens to be the lowest numbered node. The simplistic split resolution algorithm would choose the node (node 1) with high CPU usage to be the survivor as per the above-discussed tie-break rules. However, after a brief time period, the scheduling delay may become more than the network timeout which causes the node to rebooted. This means that the cluster may go down and result in database/application outage. Conventional split brain resolution protocols generally do not consider the resource usage statistics while choosing a surviving sub-cluster, and hence as illustrated above, there is a significant potential for a cluster outage if the workload on the cluster exceeds or significantly gets close to the resource capacity of the surviving node. This is especially problematic in modern cloud-based systems where there is a big push to have maximum utilization of system resources, and as such, incorrect selection of the master node may be a cause of a subsequent cluster outage problem.

Embodiments of the present invention provide an improved approach to select a surviving sub-cluster, where system resource statistics information is used to predict a cluster node failure. Resource statistics data 133 (e.g., CPU, Memory, Network bandwidth, IO bandwidth, etc.) is classified and used to identify anomalies. The anomalies can be used to determine the probability of a cluster node failure. In this way, the selection of a master node for a sub-cluster can be more intelligently performed, where the selection avoids the sub-cluster that is more likely to result in a subsequent cluster failure.

Figure 2:
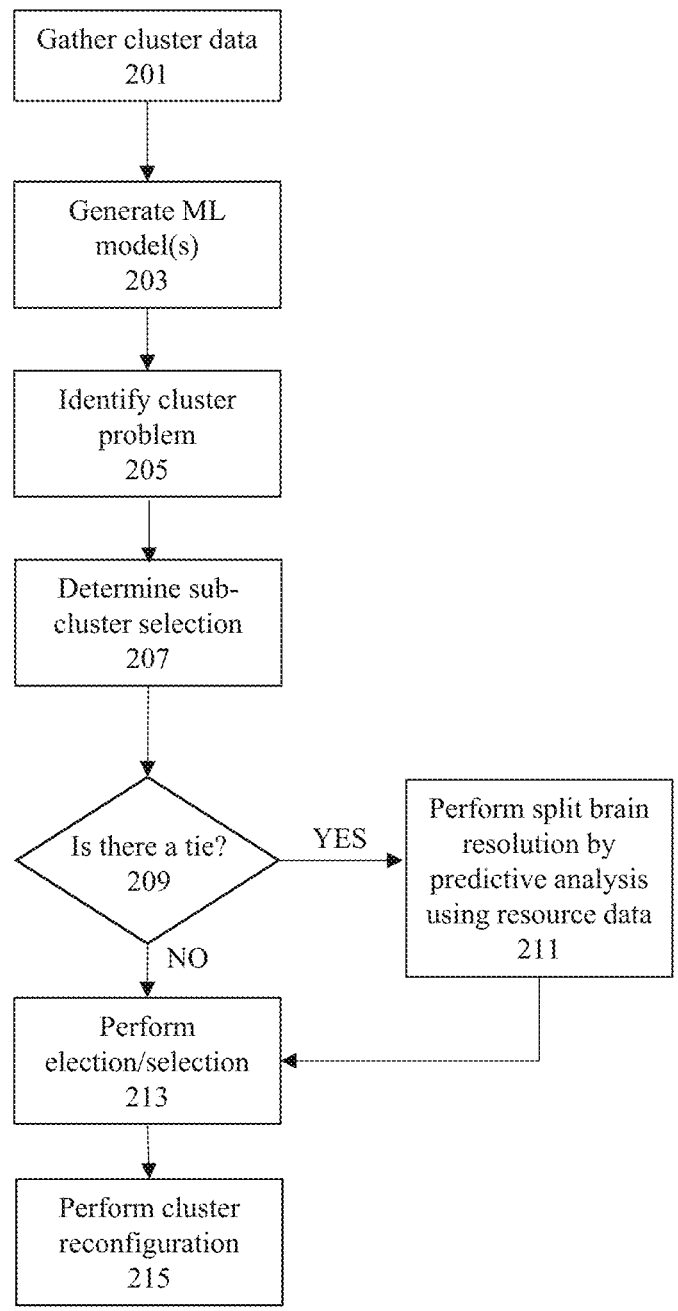
FIG. 2 shows a flowchart of an approach to implement some embodiments of the invention.

FIG. 2 shows a flowchart of an approach to implement some embodiments of the invention. At 201, cluster data is gathered for the nodes within the database system. Such gathered data includes, for example, resource statistics data such as CPU utilization, memory utilization, Network bandwidth statistics, and/or IO bandwidth statistics. The data may be gathered on supervised basis, e.g., where an administrator controls the specific set of data applied to machine learning as a supervised and/or labeled training set. The data may also be gathered on an ongoing basis without administrator supervision for unsupervised machine learning processes.

At 203, one or more machine learning models are generated for the gathered data. Any suitable approach can be taken to perform model training, including for example, decision trees, discriminant analysis, support vector machines, logistic regression, nearest neighbors, and/or ensemble classification models.

During an operational phase, a cluster problem may be identified at 205. As discussed previously, a cluster is a collection of physical/virtual servers termed as nodes, where the nodes are connected to each other via a network and the nodes of a cluster use a set of shared disk/disks. The shared storage is used for persistent storage of configuration and other cluster metadata, and part of the shared storage may also be used for resolving network partitions in the cluster. The cluster membership part of the cluster management software may use network connectivity for determining health and aliveness of various nodes in the cluster, where each node sends network heart beat messages at set time period (e.g., every second) to every other node in the cluster. If a node does not receive a heartbeat from another node for more than network timeout (e.g., 30 seconds), then in some embodiments a cluster communications problem is identified such that the cluster goes through a resolution protocol.

In some embodiment, a node that recognizes the existence of the problem may then volunteer to become the master node to resolve the communications problem and/or for the reconfiguration process. It is possible that there are multiple candidates to be the master node (since multiple nodes recognize the communications problems due to detection of the heartbeat problems), where a first node from a first sub-cluster volunteers to be the master node while a second node from a second sub-cluster also volunteers to be the master node. In this situation where multiple nodes in multiple sub-clusters are candidates to become the master node, the selection process is very important since the sub-cluster associated with the elected master becomes the surviving sub-cluster while the nodes in the non-selected sub-clusters will likely be evicted.

At 207, a split resolution protocol is performed to arrive at an optimal cluster. For example, as previously noted, a first order split resolution approach may look at the number of nodes in the sub-clusters associated with each of the volunteer to be the master. The node associated with the sub-cluster having the highest number of nodes is identified as the master node, and hence that sub-cluster being the surviving sub-cluster.

However, if the parameters of two sub-clusters (which may also be referred to as "cohorts") have the same values/weights, then at 209, a tie may exist between the candidate nodes/sub-clusters. As such, a tie breaker process may be needed to resolve the split. According to some embodiments of the invention, at 211, the tie-breaker process uses a predictive selection approach, where system resource statistics information is used to perform prediction of possible cluster node failure that may result from selection of the candidates. The resource statistics data is classified and used to identify anomalies. The anomalies can be used to determine the probability of a cluster node failure for any of the possible candidates. Therefore, at 213, a candidate can be selected to attempt to reduce and/or minimize the possibility of a cluster failure occurring from a master election. The elected master node may be employed as a "reconfiguration" master node, to implement reconfiguration of the database cluster.

At 215, the reconfiguration master would then implement reconfiguration of the cluster. Reconfiguration of member nodes of the database cluster is a process that ensures there is consensus amongst all member nodes of the database cluster as to which nodes are member nodes of the database cluster at a particular point in time. In some embodiments, the clustered database system includes cluster management infrastructure that store metadata about the status of member nodes in the database cluster. The cluster management data structure may include a node status data structure, where in some embodiments, the node status data structure includes a field, if marked appropriately, indicates that the node associated to that field is to be evicted. The reconfiguration master node may use these data structure to identify/mark which if any of the nodes in the cluster are to be evicted. Eviction of a node results in the removal of that node from being considered a member of that cluster.

A cluster manager may be configured on each node of the cluster to implement some or all of the above steps. The cluster manager is configured to manage the functionalities of the database cluster for the respective nodes in the database cluster, and which provides the infrastructure necessary to run the database cluster. Cluster managers also manages resources, such as virtual IP (VIP) addresses, databases, listeners, services, and so on. The cluster manager may manage the cluster configuration by controlling which nodes are members of the cluster and by notifying members when a node joins or leaves the cluster. Additionally, a cluster manager on each member node of a database cluster may be configured to provide heartbeat processing of the shared storage communication channel(s) on a frequent basis by writing into node status data structure to record node status information/heartbeat information into their respective portions of the node status data structure. Furthermore, in some embodiments, the cluster manager may provide the interprocess communications infrastructure that hosts the high priority message queue.

According to some embodiments, one possible approach to implement cluster topology representations for mastership election is described in U.S. application Ser. No. 16/457,368, which is hereby incorporated by reference in its entirety, in which cluster topology representations are distributed across the cluster nodes using a prioritized messaging protocol. The cluster topology representations may be implemented as a connectivity bit-vector that provides information that identifies which nodes in the cluster are able to communicatively connect with other nodes. After a failure, this information permits identification and election of a master node in a sub-cluster having the largest number of members that can talk to one another, where eviction can then take place for nodes in the other sub-cluster(s) having smaller number of members.

Figure 3:
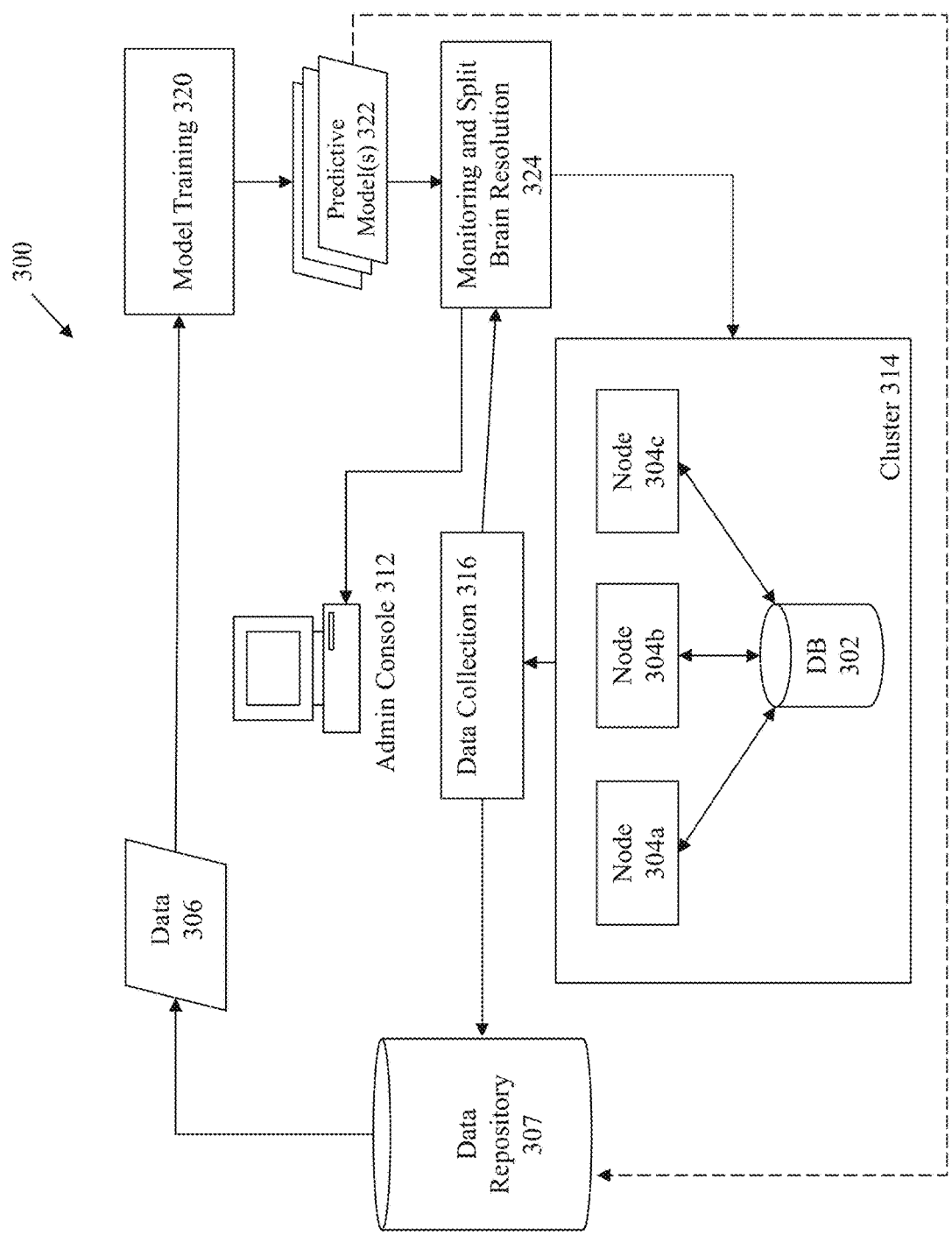
FIG. 3 illustrates a system to implement some embodiments of the invention.

FIG. 3 illustrates a system 300 for using a predictive model based upon resource statistics data to predict cluster node failures and/or to select a surviving sub-cluster/node according to some embodiments of the invention. System 300 includes a data collection mechanism 316 that collects signal data from a database system/cluster 314. In the database field, a cluster refers to a system organization in which multiple servers/instances on a plurality of hardware nodes 304a-c connect to a single database 302. In such a system, the full data 306 collected from the database cluster 314 may include signals corresponding to data for individual nodes (e.g., memory utilization, CPU utilization, IOPs, etc.), inter-node signals that may correlate to behavior or activity pertaining to nodes (e.g., certain types of networking data), as well as database-centric signals that apply to the common database (e.g., database logging signals). It is noted that a datapoint collected from the monitored target may include numerous signals values that together describe the current state of the target (a target could be, for instance, a database instance or its host).

Model training may occur by accessing data 306 from data repository 307. The data used for training may be, for example, training data which is provided to a model training process 320. The set of training examples is applied to a supervised learning algorithm (and/or unsupervised algorithms), where the goal of the machine learning process is to taken in the supplied set of known input data (as well as known outputs), and to use that data to train one or more model 322 that generates predictions for the response to new data. Any suitable approach can be taken to perform model training for any suitable model type, including for example, decision trees, discriminant analysis, support vector machines, logistic regression, nearest neighbors, and/or ensemble classification models.

A user interface is provided at an administrative console 312 to allow administration and/or control over the activities of the system 300. For example, analysis and/or validation actions can be taken at console 312 with respect to the set of data selected for training. In addition, administrative actions may be applied to monitor and/or control split brain resolutions that occur upon a cluster problem.

The predictive models 322 can be created and applied to perform split brain resolution analysis using analysis module 324. In this approach, the machine learning system performs automatic processing and transformation of large and extensive volumes of raw sensory and other diverse measurement data from the database cluster 314, where the learning model serves as the primary predictor and indicator of many of the database cluster aspects (e.g., current and predicted health state, and system availability). For example, by applying the model 322 to perceived measurement data, events can be detected that potentially correlate to cluster health and performance states, particularly with respect to possible cluster failure situations. Classified behavior can be identified that may be deemed to be normal behavior or some form of abnormal, anomalous, or fault behavior. Identification of abnormal/anomalous/fault behavior could result in generation of an anomaly identification that is provided to select a sub-cluster/node to resolve a split brain situation and/or provided to the user or administrator, e.g., by way of messaging that is sent to the administrative console 312.

According to some embodiments of the invention, the system resource statistics information is used to predict a cluster node failure, where the resource statistics data is classified using a K-means clustering algorithm. The clustered data can be used to identify anomalies, where the anomalies can be used to determine the probability of a cluster node failure. An anomaly score is given to each data point, e.g., using a local density cluster based outlier factor (LDCOF). The score is defined as the distance to the nearest large cluster, divided by the average distance to the cluster center of the elements in that large cluster.

To explain, consider a two node cluster with N1 and N2 as the two nodes. Anomaly calculations are performed for both the nodes using the procedure described below and are shared, e.g., using a shared storage location on disk. It is noted that the nodes need to only share the anomaly scores not all the observation data in the current embodiment.

Consider K=2 as the value for number of clusters in an embodiment of a K-means clustering algorithm. The algorithm should have a minimum number of data points before it can be applied. Assume that 10 is chosen as the minimum number of observations. Each observation is an average data observed during a fixed time period, e.g., with a network timeout value of 30 seconds.

Once ten observations have been collected, two random centroids can be chosen. All the data points are categorized in two clusters C1 and C2 based on a minimum Euclidean distance, e.g., as described below. The algorithm goes through multiple iterations where centroids are adjusted to be the mean of the distance within a cluster.

As shown in the example table of FIG. 4, the observations Xi in the example set of data include ten observations. Here, C1 corresponds to X1, X2, X3, X4, X5, X6, X7, and X8, whereas C2 corresponds to X9 and X10, which are each placed into a separate row within the table. In the current embodiment, Xi corresponds to a two dimensional data item, e.g., including CPU and Memory usage data in columns 402 and 404 respectively. XC1 is the Centroid Observation in C1, which in this example corresponds to X3. Column 406 indicates a distance from the cluster center for the entry in each row. Column 408 identifies an anomaly score for the entry of each row.

The table in FIG. 4 shows anomaly score calculation for N1 based on ten observations (e.g., where X3 is the centroid). Using an Euclidean distance formula in some embodiments, the following distance calculation can be determined for each entry:

$$\text{Distance of } Xi = \text{Sqrt of } \{sq(Cpu \text{ of } Xi - Cpu \text{ of } Xc1) + sq(\text{Memory of } Xi - \text{Memory of } Xc1)\};$$

The anomaly scores can then be determined from the calculated distances. The following is an example approach to determine an anomaly according to some embodiments, where Average Distance of C1=(Sum of Distances of all the observations in C1)/(Total number of observations in C1):

$$\text{Anomaly Score of } Xi = (\text{Distance of } Xi \text{ from Centroid of Large cluster i.e. } C1)/(\text{Average Distance of } C1)$$

In the example of FIGS. 4, X9 and X10 would be identified as anomalies, and as such, it can be predicted that N1 is predicted to fail during that time period. Therefore, if a split resolution is being performed during that time period, then N1 should be identified for eviction instead of the N2, as N2 is not predicted to fail. Based upon this data, N2 would be elected as the new master node for reconfiguration.

Figure 5:
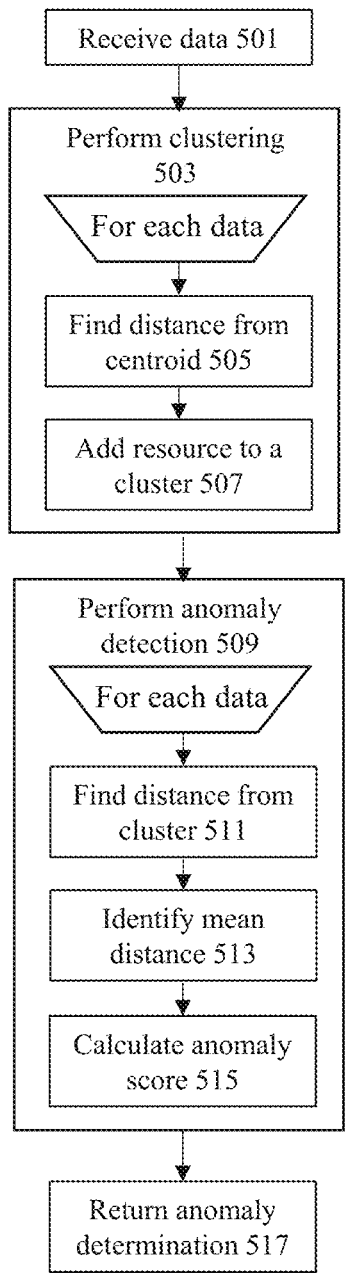
FIG. 5 shows a flowchart of an approach to perform anomaly detection according to some embodiments.

FIG. 5 shows a flowchart of an approach to perform anomaly detection according to some embodiments. At 501, the resource usage data is gathered, e.g., for CPU usage data, memory usage data, network usage data, and/or I/O usage data.

At 503, clustering is performed for the gathered data. For each of the set of gathered data, one or more steps are performed. At 505, a distance determination is made for the data. In some embodiments, the Euclidean distance from the centroids is determined. Afterwards, at 507, the resource is added to the cluster with the minimum distance that is determined.

At 509, anomaly detection is then determined using the calculated distances. For each of the set of gathered data, one or more steps are performed. At 511, identification is made of the Euclidean distance from the largest cluster. At 513, a mean distance is determined in the largest cluster. The anomaly score is then determined at 515, e.g., using the equation described above with respect to FIG. 4. Thereafter, the anomaly scores are checked to identify any anomalies, which are returned at step 517.

FIGS. 6A-H provide an illustrative example of an embodiment of the invention. At FIG. 6A, cluster data 607 gathered for a cluster is used to perform classification and clustering. In particular, the gathered data may be represented as a set of vectors, where data elements from within the gathered data provide signals that are used to formulate the vectors. One or more clusters 611 are formed from vectors, such as clusters 613 and 615 shown in the figure. Each cluster may be associated with a centroid for that cluster. For example, cluster 613 corresponds to centroid 613a and cluster 615 corresponds to centroid 615a. Here, it can be seen that cluster 613 is larger than cluster 615, where many more vectors "cluster" together to form cluster 613 as compared to cluster 615. It is noted that the term "cluster" as used in this paragraph refers to a grouping together of data points for learning and/or machine learning purposes, whereas a "database cluster" as used in other contexts within this document refers to a computing architecture that employs collective use of devices/software in a particular way within the architecture.

Figure 6A:
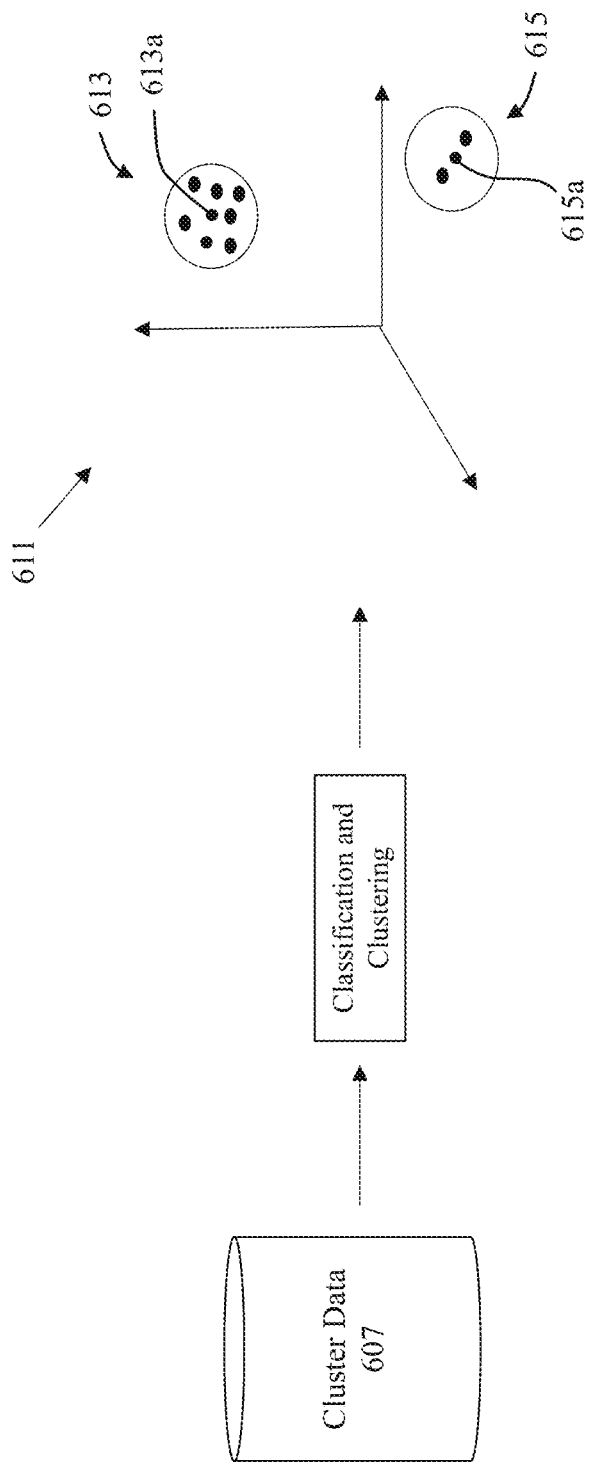
FIGS. 6A-6H provide an illustrative example of an embodiment of the invention.
Figure 6B:
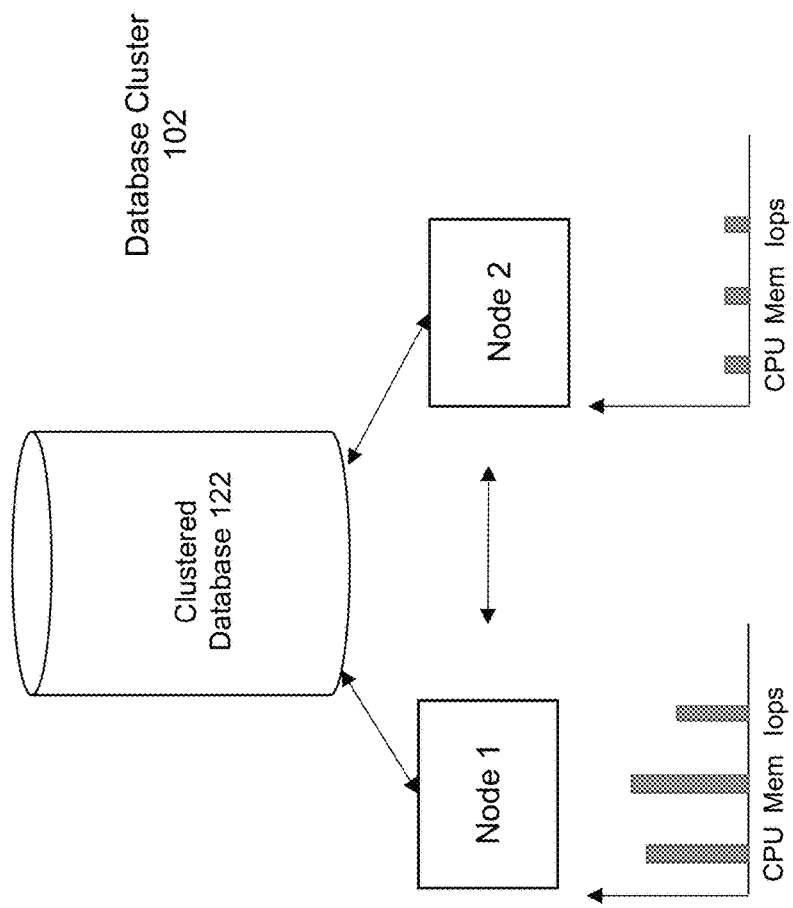

As shown in FIG. 6B, the database cluster may be a 2-node database cluster 102 that handles workloads from one or more clients that seeks to access a database through one or more application/web servers (e.g., nodes 1 and 2). The database cluster includes clustered database storage 122. As previously noted, the database storage 122 can be stored within multiple storage devices within a storage pool, and the clustered database may have one or more tables that are operated upon by the one or more clients, where the clients operate one or more user stations to issue SQL commands to be processed by the database.

Figure 6C:
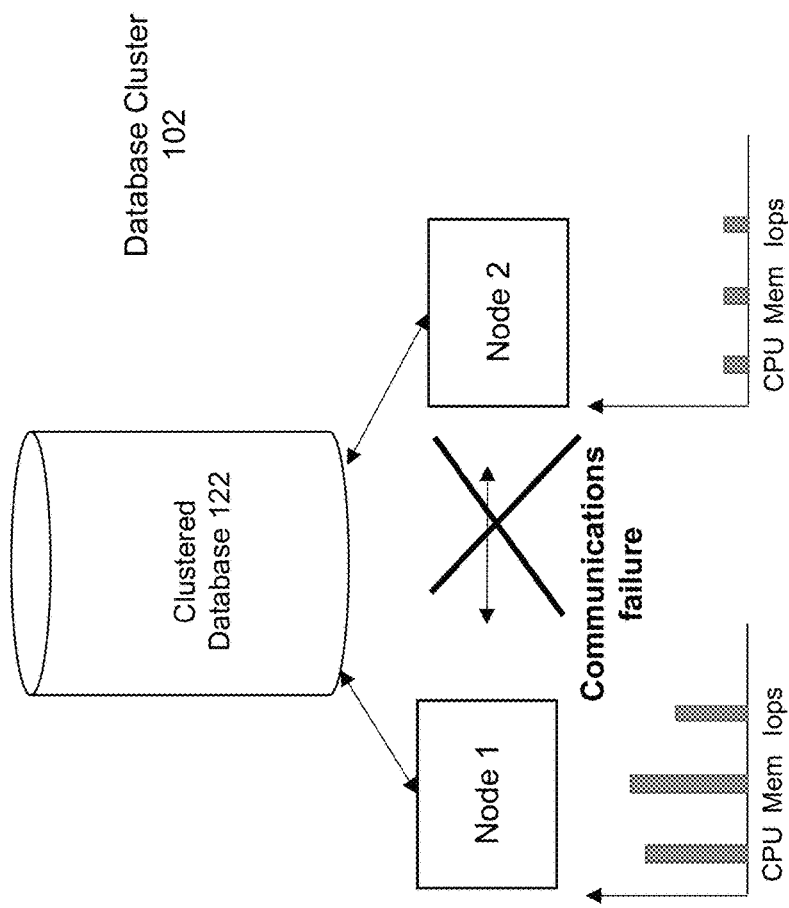

Network connectivity may be used in the cluster for determining health and aliveness of the nodes in the cluster. For example, each node may send network heartbeat messages every second to every other node in the cluster, and if a node does not receive a heartbeat from another node within a network timeout period, then a problem condition is identified, as shown in FIG. 6C.

With embodiments of the present invention, system resource information is used to predict a cluster node failure to optimize the selection of a surviving node/sub-cluster for a split resolution protocol. Distance calculations may be performed for data associated with each of the nodes to identify any predicted anomalies. Here, since cluster 613 is larger than cluster 615, some embodiments will perform the distance calculations relative to cluster 613. Specifically, assume that cluster 613 is associated with a normal set of operating conditions for a cluster node, where there is a predicted expectation of normal operations if the data for a node falls within a given threshold distance from the centroid of that cluster. However, an anomaly can be predicted if the data for a given node exceeds a threshold distance from that cluster (and/or any other cluster that is associated with or predicted for normal operating behavior).

Figure 6D:
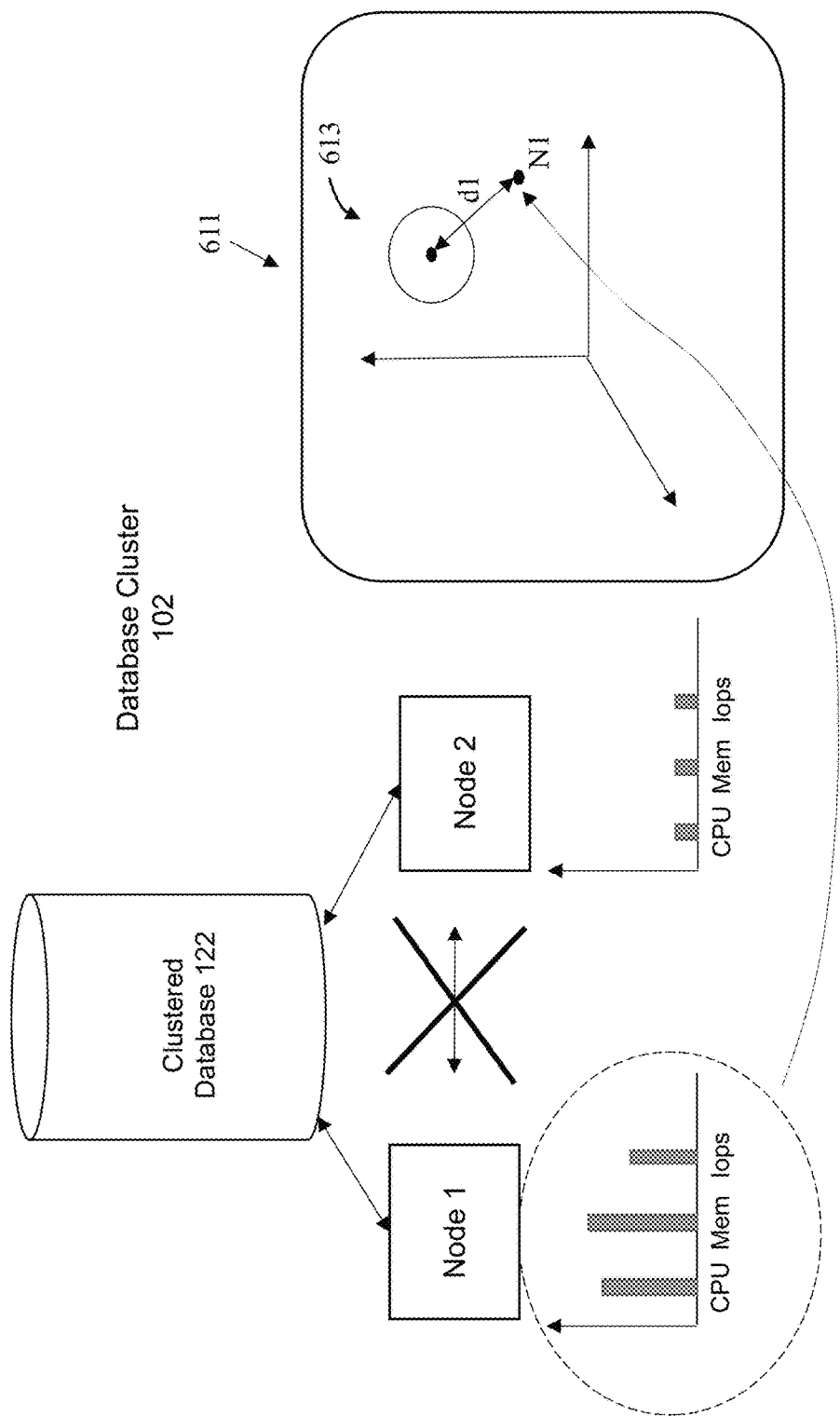
Figure 6E:
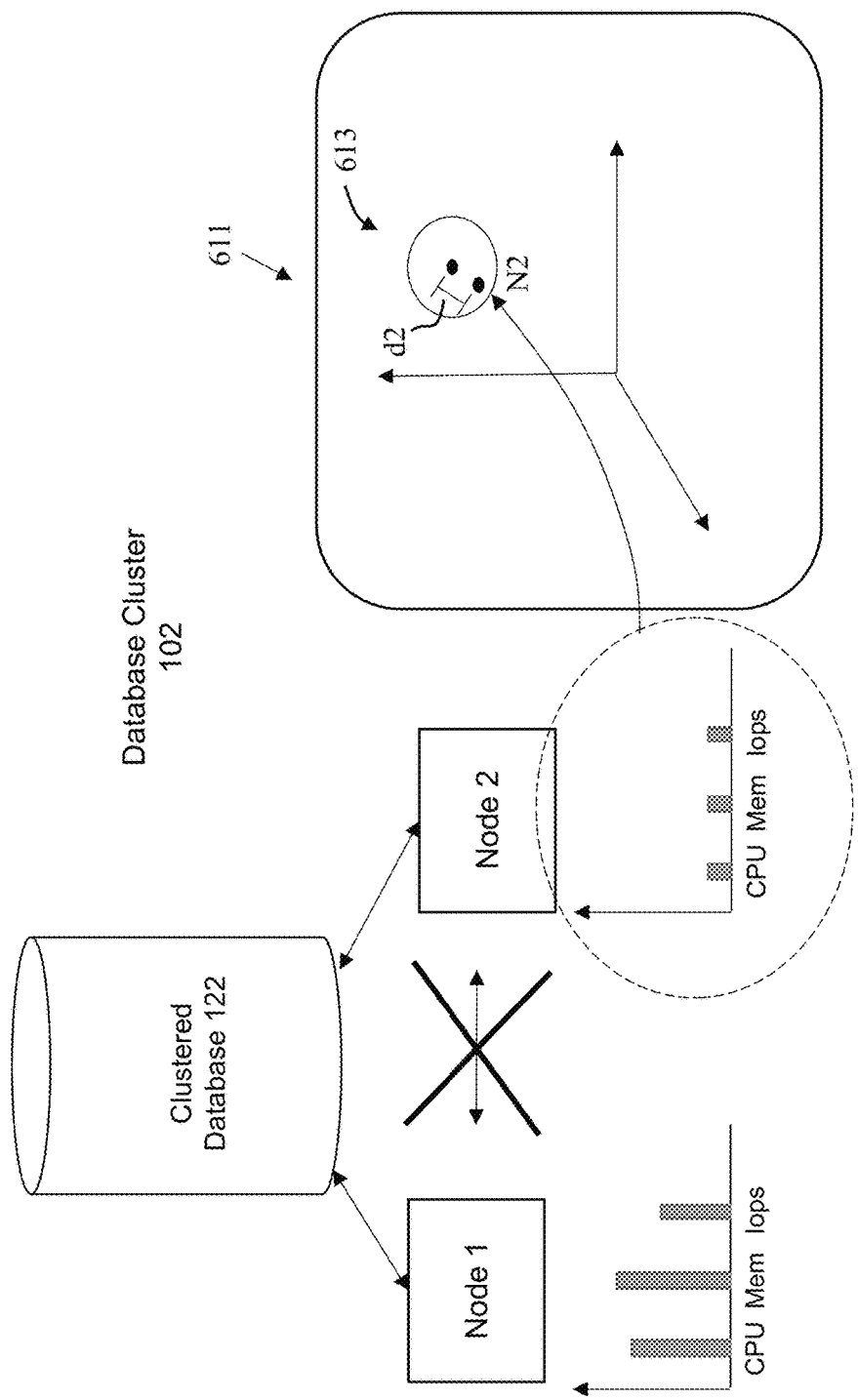
Figure 6F:
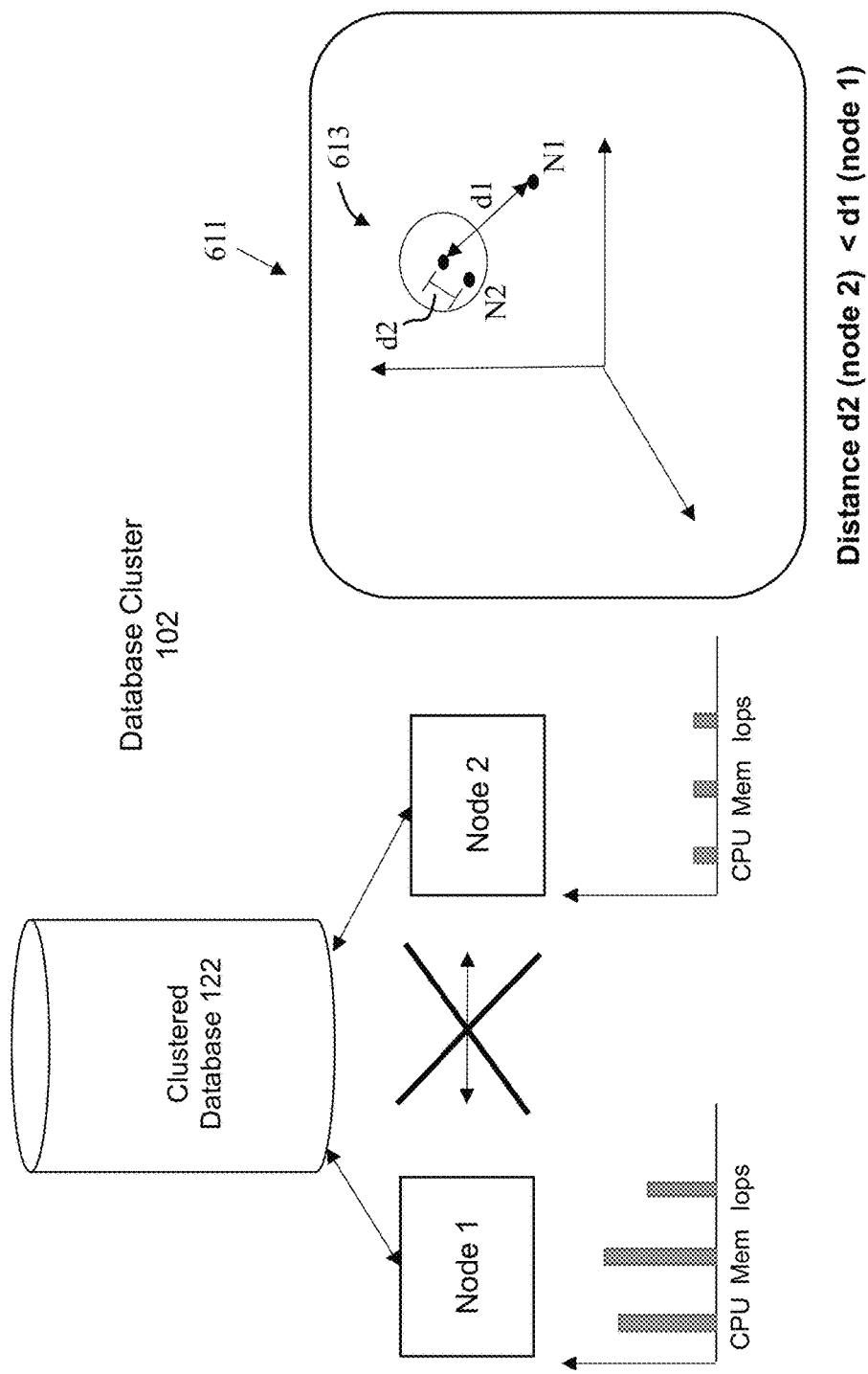

In the current illustrative example, FIG. 6D shows an example distance calculation d1 for the data for node 1 while FIG. 6E shows an example distance calculation d2 for the data for node 2. As can be seen when both are presented in the same figure as shown in FIG. 6F, the distance d2 for node 2 is far smaller than the distance d1 for node 1. In fact, the data for N1 falls far outside the cluster boundary for cluster 613, whereas the distance d2 can be visibly seen as squarely falling within the boundary of the cluster 613.

Figure 6G:
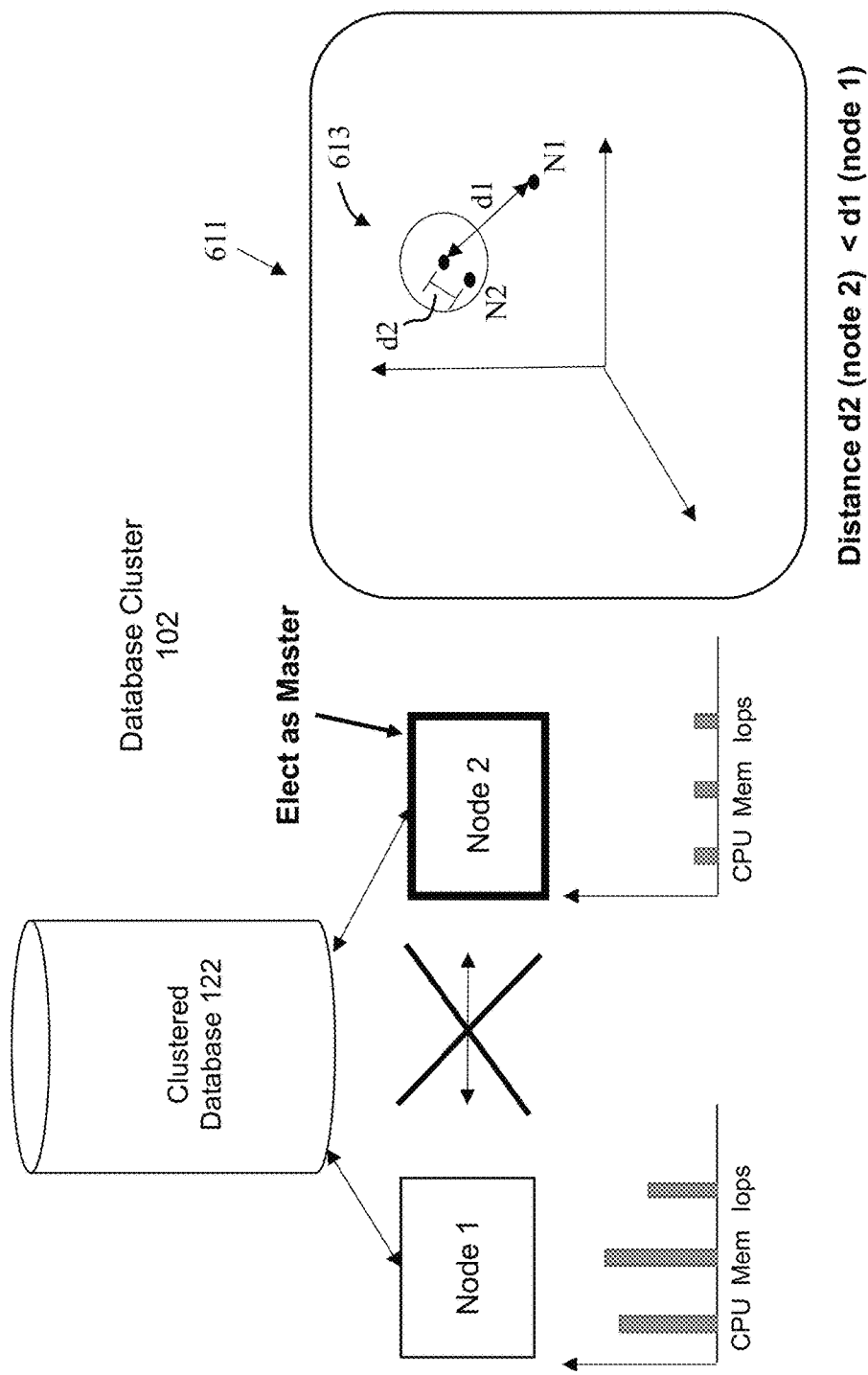
Figure 6H:
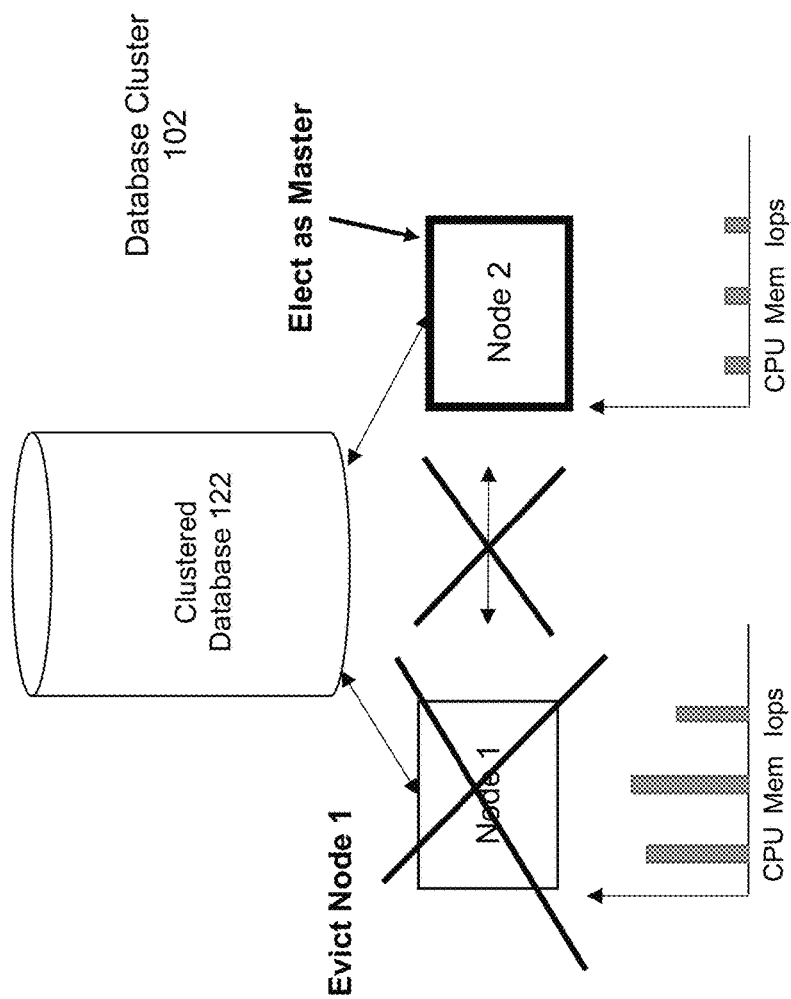

Therefore, this anomaly analysis has identified node 1 as an anomaly, with a concurrent prediction of possible cluster failure if node 1 is elected as the new master node. In contrast, node 2 is not identified as an anomaly. As a result, as shown in FIG. 6G, node 2 is elected as the new master node for the cluster. This approach has therefore optimized the split resolution process by intelligently selecting the node that is predicted as having the lower probability of causing a subsequent cluster failure. Thereafter, as part of the reconfiguration process, node 1 is evicted from the cluster as shown in FIG. 6H.

Therefore, what has been disclosed is an improved approach for performing elections in a database cluster, where system resource statistics information is used to predict a cluster node failure. Resource statistics data (e.g., CPU, Memory, Network bandwidth, IO bandwidth, etc.) is classified and used to identify anomalies. The anomalies can be used to determine the probability of a cluster node failure. In this way, the selection of a master node for a sub-cluster can be more intelligently performed, where the selection avoids the sub-cluster that is more likely to result in a subsequent cluster failure.

SYSTEM ARCHITECTURE OVERVIEW

Figure 7:
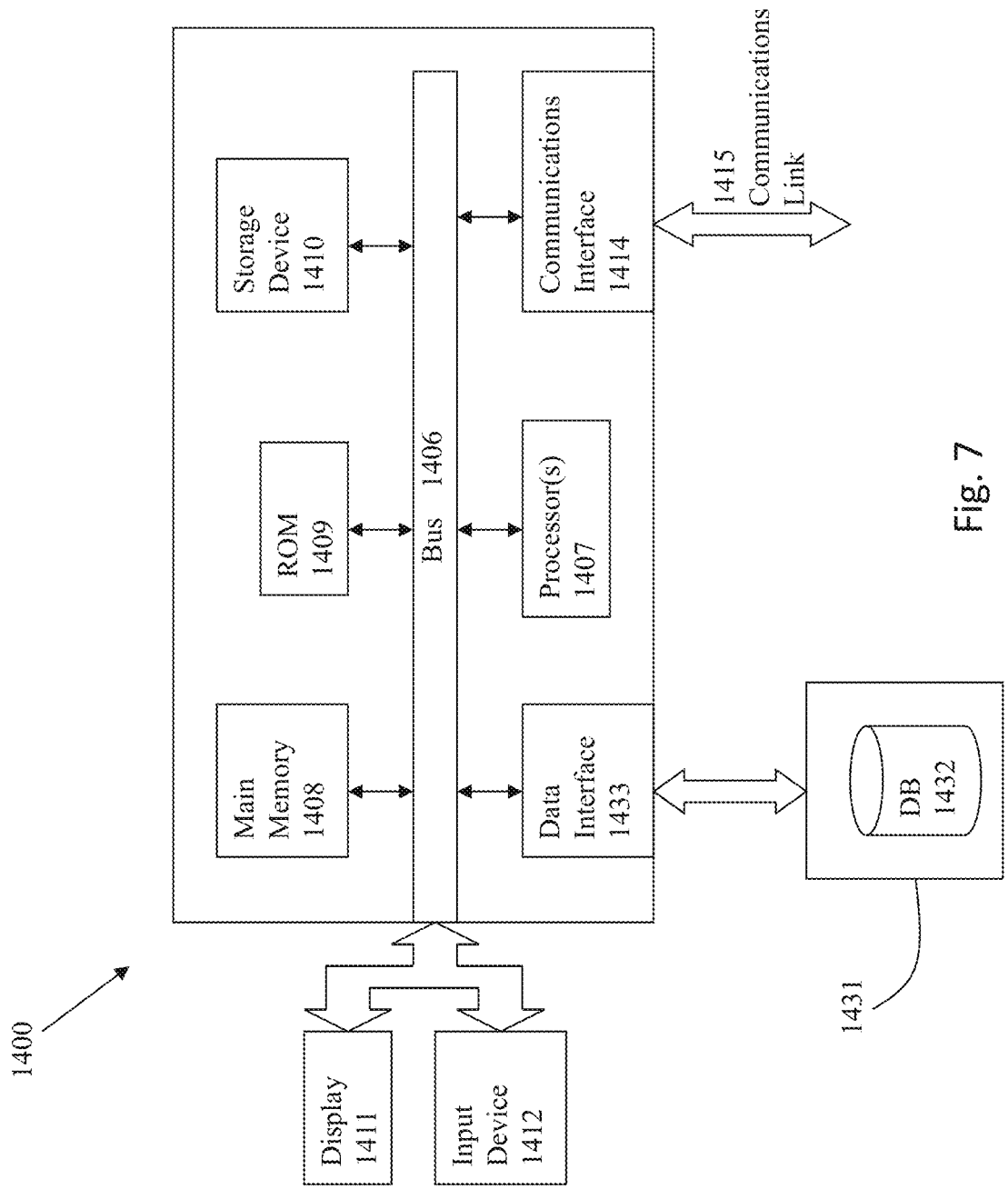
FIG. 7 is a block diagram of an illustrative computing system suitable for implementing an embodiment of the present disclosure.

FIG. 7 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data may be accessed from a database 1432 that is maintained in a storage device 1431, which is accessed using data interface 1433.

Figure 8:
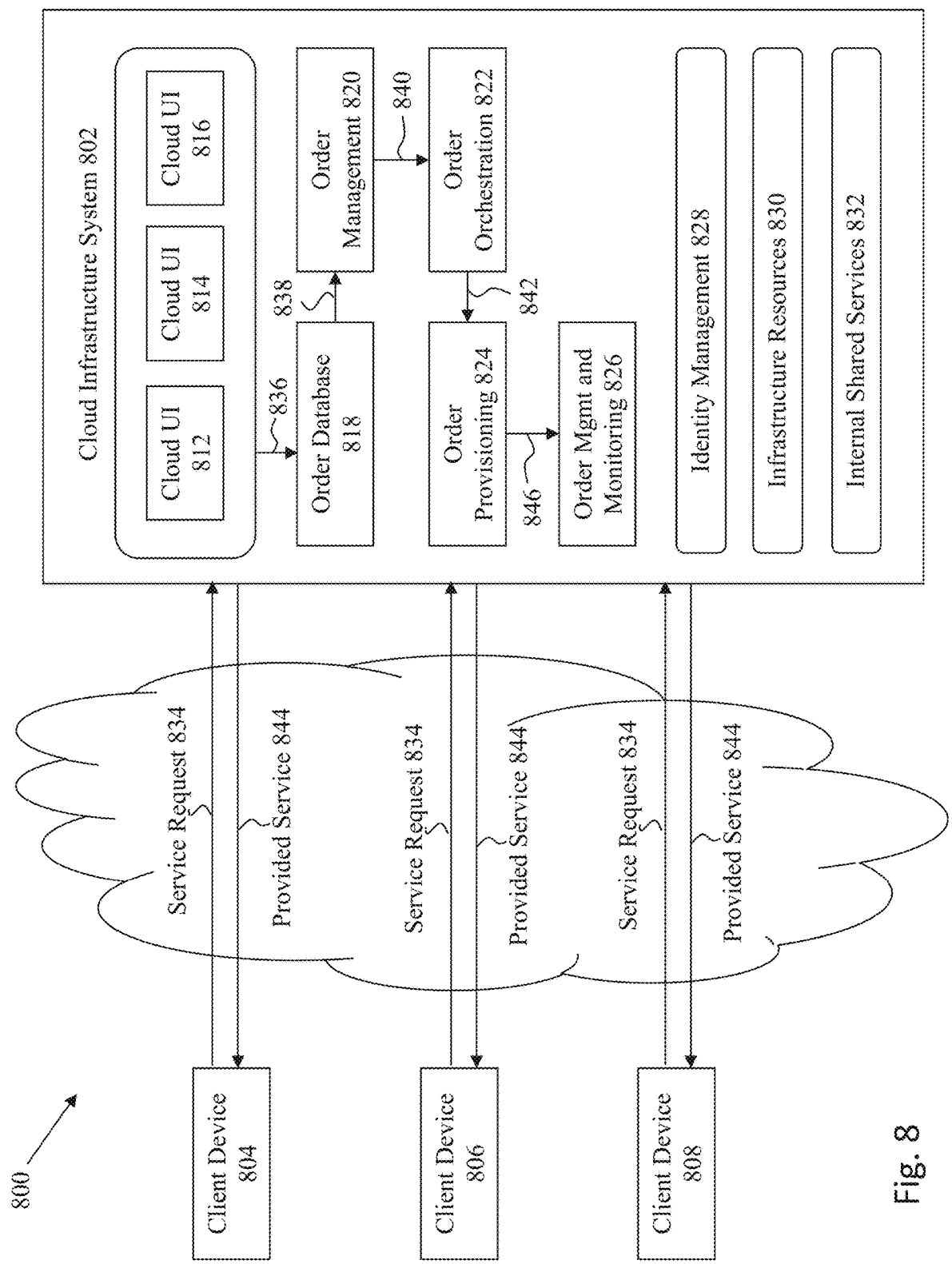
FIG. 8 is a block diagram of one or more components of a system environment by which services provided by one or more components of an embodiment system may be offered as cloud services, in accordance with an embodiment of the present disclosure.

FIG. 8 is a simplified block diagram of one or more components of a system environment 800 by which services provided by one or more components of an embodiment system may be offered as cloud services, in accordance with an embodiment of the present disclosure. In the illustrated embodiment, system environment 800 includes one or more client computing devices 804, 806, and 808 that may be used by users to interact with a cloud infrastructure system 802 that provides cloud services. The client computing devices may be configured to operate a client application such as a web browser, a proprietary client application, or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the embodiment shown in the figure is only one example of a cloud infrastructure system that may incorporate an embodiment of the invention. In some other embodiments, cloud infrastructure system 802 may have more or fewer components than shown in the figure, may combine two or more components, or may have a different configuration or arrangement of components. Client computing devices 804, 806, and 808 may be devices similar to those described above for FIG. 7. Although system environment 800 is shown with three client computing devices, any number of client computing devices may be supported. Other devices such as devices with sensors, etc. may interact with cloud infrastructure system 802.

Network(s) may facilitate communications and exchange of data between clients 804, 806, and 808 and cloud infrastructure system 802. Each network may be any type of network familiar to those skilled in the art that can support data communications using any of a variety of commercially-available protocols. Cloud infrastructure system 802 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner.

In various embodiments, cloud infrastructure system 802 may be adapted to automatically provision, manage and track a customer's subscription to services offered by cloud infrastructure system 802. Cloud infrastructure system 802 may provide the cloudservices via different deployment models. For example, services may be provided under a public cloud model in which cloud infrastructure system 802 is owned by an organization selling cloud services and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloudservices may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 830 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In operation 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814 and/or 816. At operation 836, the order is stored in order database 818. Order database 818 can be one of several databases operated by cloud infrastructure system 818 and operated in conjunction with other system elements. At operation 838, the order information is forwarded to an order management module 820. In some instances, order management module 820 may be configured to perform billing and accounting functions related to the order, such as verifying the order, and upon verification, booking the order. At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain embodiments, order orchestration module 822 enables the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 enables the allocation of resources for the services ordered by the customer. Order provisioning module 824 provides a level of abstraction between the cloud services provided by cloud infrastructure system 802 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain embodiments, cloud infrastructure system 802 may include an identity management module 828. Identity management module 828 may be configured to provide identity services, such as access management and authorization services in cloud infrastructure system 802. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

What is claimed is:

1. A computer-implemented method, comprising:
    gathering cluster data for a database cluster;
    identifying a connectivity problem in the database cluster;
    identifying a tie in a criterion for selecting a master node for reconfiguring the database cluster;
    predictively determining an anomaly score with respect to a candidate node to be the master node, wherein the cluster data is analyzed to determine the anomaly score; and
    selecting the master node based at least upon whether the candidate node is associated with an anomaly.

2. The method of claim 1, wherein the master node implements reconfiguration to evict a non-selected node from the database cluster.

3. The method of claim 1, wherein the cluster data is classified using a K-means clustering algorithm.

4. The method of claim 1, wherein the anomaly score corresponds to a distance to a cluster identified from the cluster data.

5. The method of claim 4, wherein the anomaly score also corresponds to an average distance to a cluster center for the cluster.

6. The method of claim 1, wherein the cluster data comprises at least one of central processing unit (CPU) usage data, memory usage data, network bandwidth usage data, or input/output (IO) usage data.

7. The method of claim 1, wherein the tie in the criterion for selecting the master node corresponds to a situation when two sub-clusters have an equal number of member nodes.

8. A computer program product embodied on a non-transitory computer readable medium, the non-transitory computer readable medium having stored thereon a sequence of instructions which, when executed by a processor, executes:
    gathering cluster data for a database cluster;
    identifying a connectivity problem in the database cluster;
    identifying a tie in a criterion for selecting a master node for reconfiguring the database cluster;
    predictively determining an anomaly score with respect to a candidate node to be the master node, wherein the cluster data is analyzed to determine the anomaly score; and
    selecting the master node based at least upon whether the candidate node is associated with an anomaly.

9. The computer program product of claim 8, wherein the master node implements reconfiguration to evict a non-selected node from the database cluster.

10. The computer program product of claim 8, wherein the cluster data is classified using a K-means clustering algorithm.

11. The computer program product of claim 8, wherein the anomaly score corresponds to a distance to a cluster identified from the cluster data.

12. The computer program product of claim 11, wherein the anomaly score also corresponds to an average distance to a cluster center for the cluster.

13. The computer program product of claim 8, wherein the cluster data comprises at least one of central processing unit (CPU) usage data, memory usage data, network bandwidth usage data, or input/output (IO) usage data.

14. The computer program product of claim 8, wherein the tie in the criterion for selecting the master node corresponds to a situation when two sub-clusters have an equal number of member nodes.

15. A system, comprising:
 a processor;
 a memory for holding programmable code; and
 wherein the programmable code includes instructions for gathering cluster data for a database cluster;
 identifying a connectivity problem in the database cluster;
 identifying a tie in a criterion for selecting a master node for reconfiguring the database cluster;
 predictively determining an anomaly score with respect to a candidate node to be the master node, wherein the cluster data is analyzed to determine the anomaly score; and
 selecting the master node based at least upon whether the candidate node is associated with an anomaly.

16. The system of claim 15, wherein the master node implements reconfiguration to evict a non-selected node from the database cluster.

17. The system of claim 15, wherein the cluster data is classified using a K-means clustering algorithm.

18. The system of claim 15, wherein the anomaly score corresponds to a distance to a cluster identified from the cluster data.

19. The system of claim 18, wherein the anomaly score also corresponds to an average distance to a cluster center for the cluster.

20. The system of claim 15, wherein the cluster data comprises at least one of central processing unit (CPU) usage data, memory usage data, network bandwidth usage data, or input/output IO usage data.

21. The system of claim 15, wherein the tie in the criterion for selecting the master node corresponds to a situation when two sub-clusters have an equal number of member nodes.

* * * * *

UNITED STATES PATENT AND TRADEMARK OFFICE
CERTIFICATE OF CORRECTION

| | |
|---|---|
| PATENT NO. | : 11,593,583 B2 |
| APPLICATION NO. | : 16/457445 |
| DATED | : February 28, 2023 |
| INVENTOR(S) | : Kallanagoudar et al. |

It is certified that error appears in the above-identified patent and that said Letters Patent is hereby corrected as shown below:

On the Title Page

Item [73] delete "Corporation" and insert -- Corporation, (US) --, therefor.

On page 2, Column 2, item [56] under Other Publications, Line 3, delete "Conferernce" and insert -- Conference --, therefor.

In the Specification

In Column 11, Line 1, delete "FIGS." and insert -- FIG. --, therefor.

In Column 13, Line 30, delete "PTSN," and insert -- PSTN, --, therefor.

In the Claims

In Column 20, Line 22, in Claim 20, delete "IO" and insert -- (IO) --, therefor.

Signed and Sealed this
Second Day of January, 2024

Katherine Kelly Vidal
*Director of the United States Patent and Trademark Office*